US012738828B2

(12) United States Patent
Julen et al.

(10) Patent No.: US 12,738,828 B2
(45) Date of Patent: Sep. 15, 2026

(54) LINEAR DRIVE FOR TRACK-GUIDED MEANS OF LAND TRANSPORTATION OR RAILWAY VEHICLES

(71) Applicant: INDRIVETEC AG, Zürich (CH)

(72) Inventors: Eric Julen, Zürich (CH); Martin Vinzens, Zürich (CH)

(73) Assignee: INDRIVETEC AG, Zürich (CH)

( * ) Notice: Subject to any disclaimer, the term of this patent is extended or adjusted under 35 U.S.C. 154(b) by 165 days.

(21) Appl. No.: 18/558,255

(22) PCT Filed: May 3, 2022

(86) PCT No.: PCT/EP2022/061769
§ 371 (c)(1),
(2) Date: Oct. 31, 2023

(87) PCT Pub. No.: WO2022/233822
PCT Pub. Date: Nov. 10, 2022

(65) Prior Publication Data
US 2024/0223059 A1 Jul. 4, 2024

(30) Foreign Application Priority Data
May 3, 2021 (EP) .................................... 21171873

(51) Int. Cl.
*H02K 41/025* (2006.01)
*B60L 13/03* (2006.01)

(52) U.S. Cl.
CPC ............ *H02K 41/025* (2013.01); *B60L 13/03* (2013.01); *B60L 2200/26* (2013.01)

(58) Field of Classification Search
CPC ...... H02K 41/02; H02K 41/025; H02K 41/03; H02K 41/031; H02K 41/033; B60L 13/03; B60L 13/006; B60L 13/10
See application file for complete search history.

(56) References Cited

U.S. PATENT DOCUMENTS 3,616,762 A * 11/1971 Benner ................ H02K 41/025 310/13
4,727,813 A * 3/1988 Matsuo .................. B60L 13/03 104/90
(Continued)

FOREIGN PATENT DOCUMENTS

EP 2 269 289 B1 11/2019
JP 5-336616 A 12/1993
(Continued)

OTHER PUBLICATIONS

International Search Report Issued Aug. 12, 2022, in PCT/EP2022/061769, filed on May 3, 2022, 4 pages.
(Continued)

*Primary Examiner* — Oluseye Iwarere
*Assistant Examiner* — Nicholas Lee Setzer
(74) *Attorney, Agent, or Firm* — Oblon, McClelland, Maier & Neustadt, L.L.P.

(57) ABSTRACT

In a linear drive for track-guided land transportation or railway vehicles, which includes a primary part and a secondary part in magnetically active connection thereto, the primary part is formed as a reaction track and the secondary part includes a number of magnets. The secondary part includes at least one first magnetic wheel. The number of magnets is arranged in this first magnetic wheel. The reaction track is magnetically actively connected to this number of magnets. The secondary part is mechanically connected to a rotation drive.

14 Claims, 4 Drawing Sheets

(56) References Cited

U.S. PATENT DOCUMENTS

| | | | | |
|---|---|---|---|---|
| 2002/0117378 | A1* | 8/2002 | Buchi | B65G 54/02 198/619 |
| 2003/0025163 | A1* | 2/2003 | Kwon | H10D 30/0275 257/E21.624 |
| 2003/0205163 | A1* | 11/2003 | Lamb | B65G 54/02 104/282 |
| 2005/0179318 | A1* | 8/2005 | Paradis | B62M 27/02 305/116 |
| 2006/0236890 | A1 | 10/2006 | Lamb et al. | |
| 2015/0175031 | A1* | 6/2015 | Henderson | H02K 7/09 180/65.8 |
| 2018/0159416 | A1* | 6/2018 | Julen | H02K 9/22 |
| 2019/0100389 | A1* | 4/2019 | Neubauer | H02K 7/08 |
| 2024/0223059 | A1* | 7/2024 | Julen | H02K 41/025 |

FOREIGN PATENT DOCUMENTS

| | | | |
|---|---|---|---|
| JP | 9-261805 | A | 10/1997 |
| WO | WO 2015/191935 | A1 | 12/2015 |

OTHER PUBLICATIONS

International Preliminary Examining Authority issued Aug. 9, 2023, in PCT/EP2022/061769, filed on May 3, 2022, 17 pages.

* cited by examiner

LINEAR DRIVE FOR TRACK-GUIDED MEANS OF LAND TRANSPORTATION OR RAILWAY VEHICLES

TECHNICAL FIELD

The present invention comes under the technical area of electrical drives for track-guided means of land transportation or railway vehicles; it primarily relates to a linear drive for the operation of a vehicle along a section of a route according to the preamble of claim 1.

PRIOR ART, TECHNOLOGICAL BACKGROUND TO THE INVENTION

A linear drive or linear motor is an electrical drive machine in which, in contrast to known, rotating machines, the driven objects are not displaced in a rotating motion but are translated along a straight line or curved path. Consequently, in linear drives we do not talk about a rotation movement but a translation movement.

A known application of such linear drives has been present for decades in roller coasters; typically, in this case, roller coaster trains are catapulted at two-minute intervals by an electromagnetic linear drive on a track pattern made of steel tubes, wherein such a ton-heavy roller coaster train obtains its initial energy on a catapult route about 50 metres long using approximately 100 linear induction motors—also known as LIM—installed in pairs. Such a LIM was and is therefore a consequential further development of a contactless acceleration system with the aim of extensive lack of mechanical maintenance. Furthermore, LIMs are also used in mechanical drives of door systems—such as in supermarkets, for example—or for passenger conveyor belts and luggage belts at airports.

Other electromagnetic functioning principles are also of interest for roller coasters, and in this case the linear induction motors are indeed replaced with linear synchronous motors—also known as LSM—the efficiency of which is comparably higher than with the LIM. In this case, leading providers of roller coasters often resort to high breakthrough LSM acceleration tracks that manage to attain peak speeds of around 180 kilometres per hour.

The working principle of the linear induction motor is inherited from the alternating current motor. The only and most noticeable difference in this is that a translational instead of a rotating movement is produced. The stator coils arranged in a circular pattern in the alternating current motor are placed on a plane, linear path here. The “rotor” that rotates in the alternating current motor, in the linear synchronous motor moves over a straight line path. If a current is conducted through a copper wire, then a magnetic field emerges around it. The field intensity thereof depends on the current applied. To maximise the magnetic field produced and to control its direction of propagation geometrically, the copper wire is wound around an elongated iron core—the ferrite core—, wherein evidently an ironless embodiment is also conceivable. A coil is produced which, when current is applied, has the same properties as a permanent magnet. On the respective ends of the ferrite core, a north and a south pole are produced. In linear motors, many such coils in a row are connected in series. Here, along a track, motor modules with three phase coils—the stators—are arranged over an entire acceleration section or catapult section, which are grouped with a 20 millimetre wide linear air gap. Therefore, the motor exhibits a length of about one metre. On the train is located a copper or aluminium track as a reaction track as what is known as a rotor, which reaction track is pulled by the LIM motor contactlessly through the gap. Therefore, the operating principle of the drive follows the law of induction. An alternating current voltage applied generates an erratic magnetic field with constant change of polarity between north and south in the coils of the linear motor. The erratic field moves along the catapult route, its speed of progress is determined by the frequency of the current applied. The erratic magnetic field applied in the stator induces an electrical voltage in the “rotor medium”, which sets the free electrons in the reaction track in motion. This flow of electrons generates a magnetic field in turn. Both magnetic fields mutually interact, unlike poles attract and like poles repel. By the interaction of both magnetic fields, a force component in the direction of the erratic field emerges that sets the roller coaster train in motion. The translational drive force is primarily dependent on the relative velocity Δv between the train and the erratic magnetic field. If both are the same speed, no counter magnetic field is produced and the acceleration is equal to zero.

During the acceleration phase, the speed of the train—and therefore of the rotor—is always less than that of the driving stator field. The magnetic field produced in the rotors therefore moves over the reaction track and even jumps through adjacent reaction tracks from car to car. If the speeds of the stator field and the train were equal, then no voltage would be induced in the rotor and the force driving the train is no longer maintained. If the speed of the train were even greater than the stator field, then the direction of force would rotate and the train is braked. Such interrelationships are known to result from the physical induction law.

The document EP 3 107 195 A1 discloses a known linear drive; it relates to a linear motor drive system for acceleration of a vehicle within an acceleration section on a route. The linear motor drive system comprises a stator with at least two stator elements arranged along the route, wherein the stator elements are combined into stator groups. Furthermore, the linear motor drive system comprises a rotor which is fastened to the vehicle. Therefore, each stator group is permanently connected by its own energy converter to the energy supply, which energy converter can be actuated individually. At least two of the stator groups are arranged in such a way that the rotor can interact with these two stator groups concurrently. The linear motor drive system present in this case is suitable for acceleration of a vehicle for transporting passengers in an amusement facility, such as a roller coaster, for example. Document EP 2 269 289 B1 describes a transport device based on an eddy current drive. The device comprises a track and two rotating discs arranged in parallel, driven by an electric motor. Magnets are provided around the circumference of the rotating discs. The drive is, for example, provided for track-guided cars. Furthermore, document US 2003/205163 A1 describes a system with which cars are elevated and can be accelerated. Document WO 2015/191935 A1 describes a drive and a control system for magnetic levitation of a vehicle. A levitation drive exhibits rotating discs for this purpose, which are provided with magnets and induce eddy currents in a base. Document JP H09 261805 A discloses a magnetic levitation drive in which the rotating magnetic discs are arranged opposite a conductor track and levitate a vehicle and drive it linearly along the track.

REPRESENTATION OF THE INVENTION

It is the task of the present invention to develop a linear drive for track-guided means of land transportation or railway vehicles in such a way that a simpler and more efficient system structure of this linear drive is enabled, that embodies a space-saving overall system installation compared with conventional linear drives.

The core of the present invention is to be seen in that a linear drive for track-guided means of land transportation or railway vehicles comprises a primary part and a second part fixed in magnetic active connection to this, wherein the primary part is formed as at least one first reaction track and the secondary part comprises a number of magnets, wherein the secondary part comprises at least one first magnetic wheel and the number of magnets which are arranged on the at least one first magnetic wheel, and wherein the at least one first magnetic wheel is in magnetic active connection to the at least one reaction track and the secondary part is mechanically connected to a rotation drive.

In summary it is appreciable that the magnetic fields from the magnets aligned alternately on the circumference of the secondary part are in motion due to the rotation of the rotation drive towards the primary part in such a way that eddy currents I are formed in the primary part designed as a reaction track, which in turn interact in connection with these alternately aligned magnetic fields in such a way that consequently a desired, mechanical force is provided; on the primary part is, therefore "simulated a virtually continuous extension in length of the same" by means of the rotating secondary part. Therefore, the magnetic wheels that are a sub-system installation with respect to the secondary part, essentially comprise a rotation drive driving them, in a compact unit which can be arranged concentrated in a region of a vehicle and furthermore is available to be used over the entire route and at each location of the route on which the primary part is arranged, act in interaction with the same and, indeed both (positively) accelerating and braking. Evidently, for each vehicle, several of these magnetic wheel systems may also be installed, with which the entire system power can be increased and/or the several drive units can be designed smaller with the predefined overall system power.

Particularly advantageous for this is that with the invention a considerably shorter secondary part is possible in relation to the length of the known vehicles than conventional secondary parts, which are also frequently arranged approximately along an entire vehicle length.

The amount of propulsion force can be adjusted by means of a controllable rotation speed of the rotation drive; the forwards or reverse direction of rotation in relation to a direction of travel of a vehicle determines the type of acceleration in the sense of an increase in velocity or a reduction in velocity.

The primary part formed as a reaction track for the formation of the necessary eddy currents I is made of an electrically-conducting material; for example, the reaction track may be made of copper or the comparably worse-conducting aluminium, which has the advantage of being considerably lighter and also cheaper; other electrically-conducting materials may also be used.

The present simple design of the sub-system installation with respect to the primary part, in other words, as a simple reaction track, then allows an entire route of the conventional ride to be equipped with such a reaction track, with which the vehicle velocity is permanently controllable.

Compared with the prior art, the invention now provides for the first time a linear drive for track-guided means of land transportation or railway vehicles, the total system installation of which is markedly simpler to implement and in the operation of which the energy consumption no longer only has to be concentrated on conventional individual acceleration track sections, but can be distributed over the entire route.

In an advantageous embodiment of the invention it is provided that the secondary part comprises the first magnetic wheel and a second magnetic wheel arranged parallel to it, wherein the at least one first reaction track is arranged between the first magnetic wheel and the second magnetic wheel and is magnetically actively connected to both wheels.

In an embodiment of the invention, it is provided that the magnets are arranged on a side of the first magnetic wheel or the second magnetic wheel facing towards the reaction track, or that the magnets are arranged on one of the sides of the first magnetic wheel and the second magnetic wheel facing towards the reaction track. Therefore, it is provided that magnets mutually opposite on the first and second wheel exhibit different polarity and adjacent magnets on a relevant wheel likewise.

In a further embodiment of the invention, it is provided that the primary part is arranged fixed in place and that the secondary part is moving. Furthermore, in a further embodiment, it may be provided that the secondary part is fixed in placed and the primary part is moving. Advantageously, the magnets are formed in a further embodiment as permanent magnets, or the magnets are formed as separately-excited electromagnets.

For the purpose of increasing the magnetic effect, it may further be provided that the magnets formed as separately-excited electromagnets comprise a ferrite core.

An advantageous embodiment provides that the secondary part and the rotation drive are arranged on a drive platform, by which a unit as compact as possible can be provided.

Advantageously, the linear drive in an embodiment exhibits a magnetic active connection between the primary part and the secondary part as an asynchronous coupling, wherein, in the primary part a number of eddy currents I are able to be induced.

In a further advantageous embodiment of the invention it is provided that the primary part comprises the at least one reaction track and at least one second reaction track parallel thereto, which are magnetically in active connection to the secondary part, wherein the secondary part comprises the first and second magnetic wheel and also at least one third magnetic wheel; through this parallel arrangement of two—or possibly more—reaction tracks, the overall system performance can be increased in a concentrated construction.

Furthermore, in a further embodiment of the linear drive according to the invention, it can be provided that to form the rotation drive as an electric or as a hydraulic or as a pneumatic machine, or that the rotation drive is able to be formed as a combined drive from a group of electric, hydraulic or pneumatic machines.

Further illustrative examples of the linear drive for track-guided means of land transportation or railway vehicles according to the invention and their relevant advantages are the object of the detailed description and the figures.

BRIEF DESCRIPTION OF THE DRAWINGS

In the following, the invention is explained as an example using the figures. The same objects are, in principle, provided with the same reference numbers in the figures. At this place, it is pointed out that the figures have no limiting effect on the present object of the invention as such but show only illustrative examples of the concept of the invention—as represented in the claims.

Purely diagrammatically.

WAYS OF IMPLEMENTING THE INVENTION

Figure 1A:
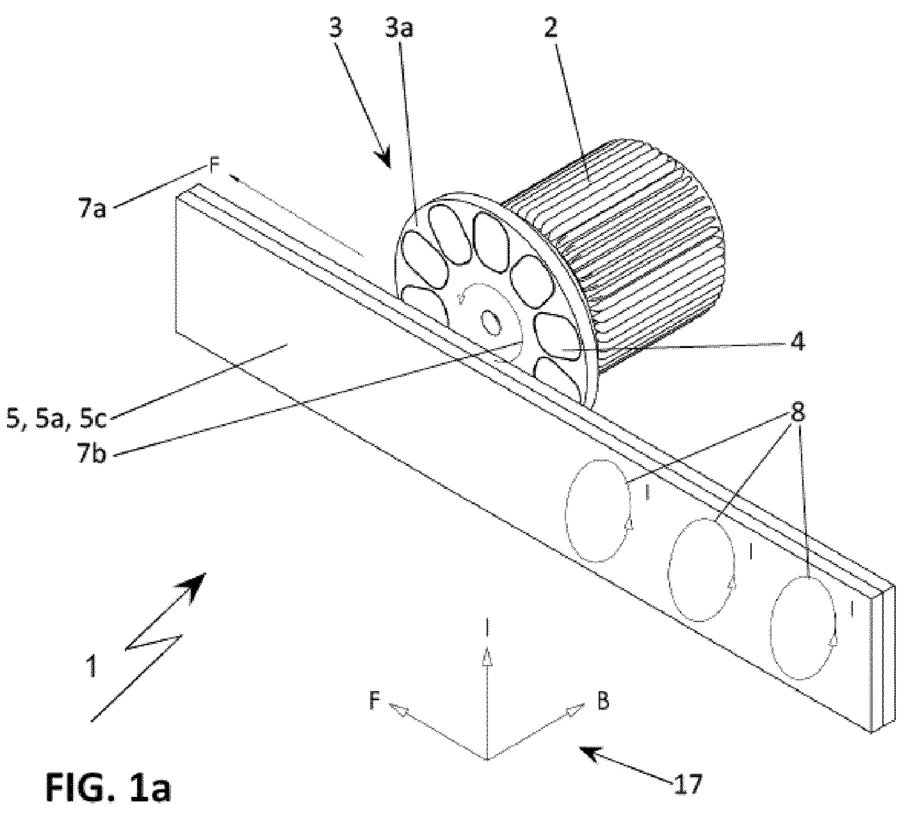
FIGS. 1*a*, 1*b* and 1*c* show a linear drive for track-guided means of land transportation or railway vehicles according to the invention with a primary part formed as a reaction track and a secondary part, which comprises a magnetic wheel or a first and second magnetic wheel, which are represented in detail in FIG. 1*c;*

FIG. 1*a* shows a linear drive 1 for track-guided means of land transportation or railway vehicles according to the invention in a perspective plan view. This linear drive 1 essentially comprises at least one primary part 5 formed as a reaction track 5*a* with a thrust plate 5*c*, furthermore a secondary part 3, which is formed as at least one first magnetic wheel 3*a* and a rotation drive 2, which is mechanically connected to the at least one first magnetic wheel 3*a*. The at least one first magnetic wheel 3*a* is fitted with magnets 4, and indeed in such a way that these magnets 4 produce a magnetic field penetrating the reaction track 5*a* and induce a number of eddy currents I 8 in this reaction track 5*a*, which interact with the magnetic field, wherein the magnetic field closes over the thrust plate 5*c* of the primary part 5 in a known way.

Figure 1B:
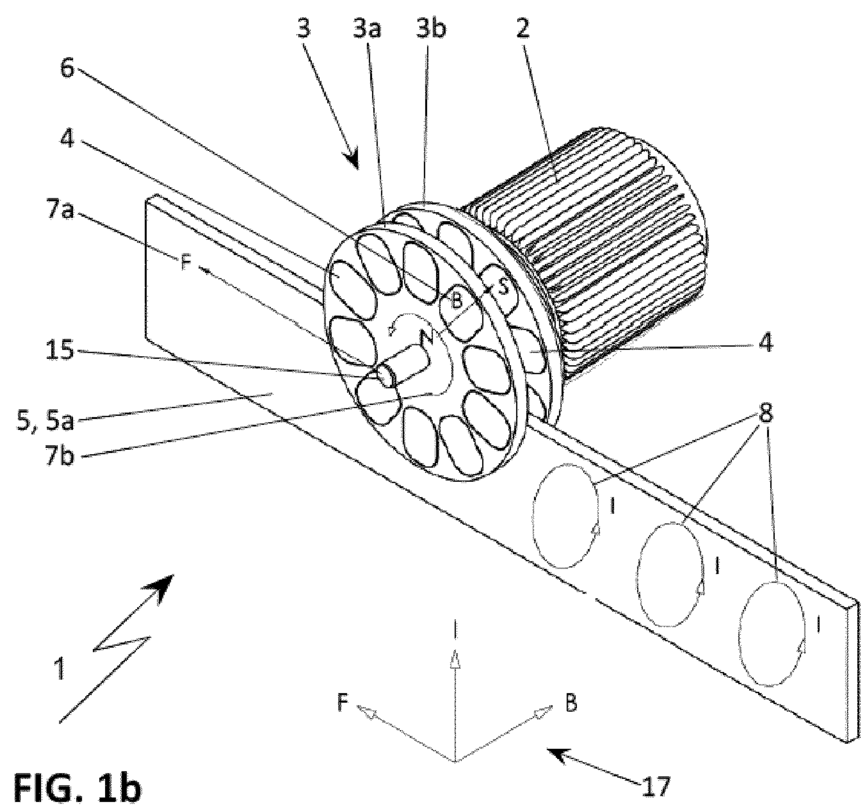

In FIG. 1*b*, the linear drive 1 according to the invention in an illustrative example is equipped, in addition to the first magnetic wheel 3*a* with at least one second magnetic wheel 3*b* of the secondary part 3, wherein the first and the second magnetic wheel 3*a*, 3*b* are arranged mutually parallel on a common axle 15 of the rotation drive 2, and wherein the first and second magnetic wheel 3*a*, 3*b* are mutually spaced on this axle 15 in such a way that the at least one first reaction track 5 can be arranged magnetically actively connected in between.

Figure 1C:
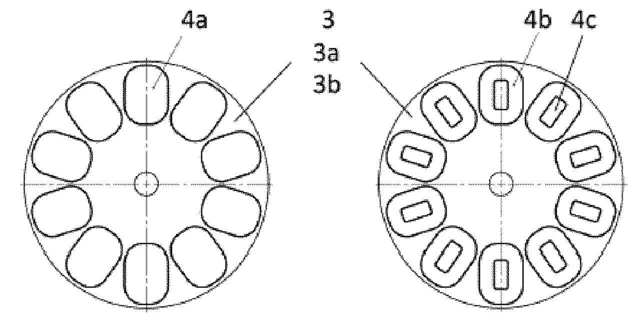
Figures 2A, 2B, 2C, 2D, 2E:
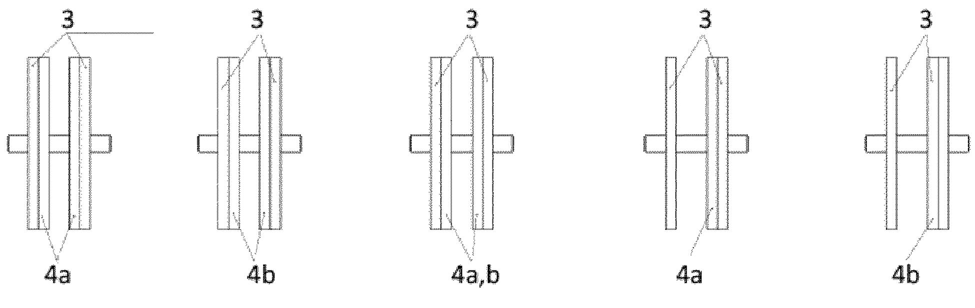
FIGS. 2*a*, 2*b*, 2*c*, 2*d*, and 2*e* show illustrative examples of the linear drive according to the invention according to FIG. 1*a* with differently-fitted, magnetic supporting wheels.

The first and/or the second magnetic wheel 3*a*, 3*b* is/are fitted with magnets 4, in such a way that these magnets 4 produce the magnetic field B 6 between this first and this second magnetic wheel 3*a*, 3*b*, which magnetic field B 6 also penetrates the reaction track 5*a* and therefore interacts with the same. FIG. 1*c* also shows possible arrangements of the magnets 4 on the first and second magnetic wheel 3*a*, 3*b*. Primarily the secondary part 3 in FIG. 1*c* is shown in plan view on the first magnetic wheel 3*a* and the second magnetic wheel 3*b*, wherein on one of the two the magnets 4*a* are formed as permanent magnets 4*a* and on the other as electromagnets 4*b*, also with a relevant ferrite core 4*c*. In the arrangement of the linear drive 1 according to the invention it is be determined which type of magnets 4 are to be used, permanent magnets 4*a* and/or electromagnets 4*b* with or without ferrite core 4*c*. In this context, looking at FIGS. 2*a* to 2*e* is also helpful: In other words, therefore, in FIG. 2*a*, the secondary part 3 is illustrated simplified in a side view, wherein in this case, mutually facing permanent magnets 4*a* are used, in FIG. 2*b*, mutually facing electromagnets 4*b* are used, in FIG. 2*c* mutually facing permanent magnets 4*a* and electromagnets 4*b* and in FIGS. 2*d* and 2*e* respectively permanent magnets 4*a* or electromagnets 4*b* arranged only on one side. It is well-known that for the purpose of the expected magnetic field B 6 in FIG. 1*b*, respectively adjacent magnets 4 on the respective first or second magnetic wheel 3*a*, 3*b* exhibit a different polarity and therefore mutually-opposite magnets 4 are shown as examples firstly on the first magnetic wheel 3*a* and secondly on the second magnetic wheel 3*b*, insofar as both are equipped with magnets 4 as in FIGS. 2*a* to 2*c*. FIG. 1*b* shows the magnetic field B 6 using an example, which magnetic field B 6 is produced between the first and second wheel 3*a*, 3*b* by both relevant magnets 4 with the polarities "N" or "S". In the circumferential direction of the first and second magnetic wheel 3*a*, 3*b*, the direction of the magnetic field B 6 changes to the respective adjacent magnet 4, wherein this is not illustrated explicitly, primarily for the sake of simplicity; nevertheless, such magnet arrangements are sufficiently known in the technical field of electric machines so that such magnet arrangements are foreseeably known—directly and unambiguously—from the present figures even without detailed illustrative representation.

Figure 3:
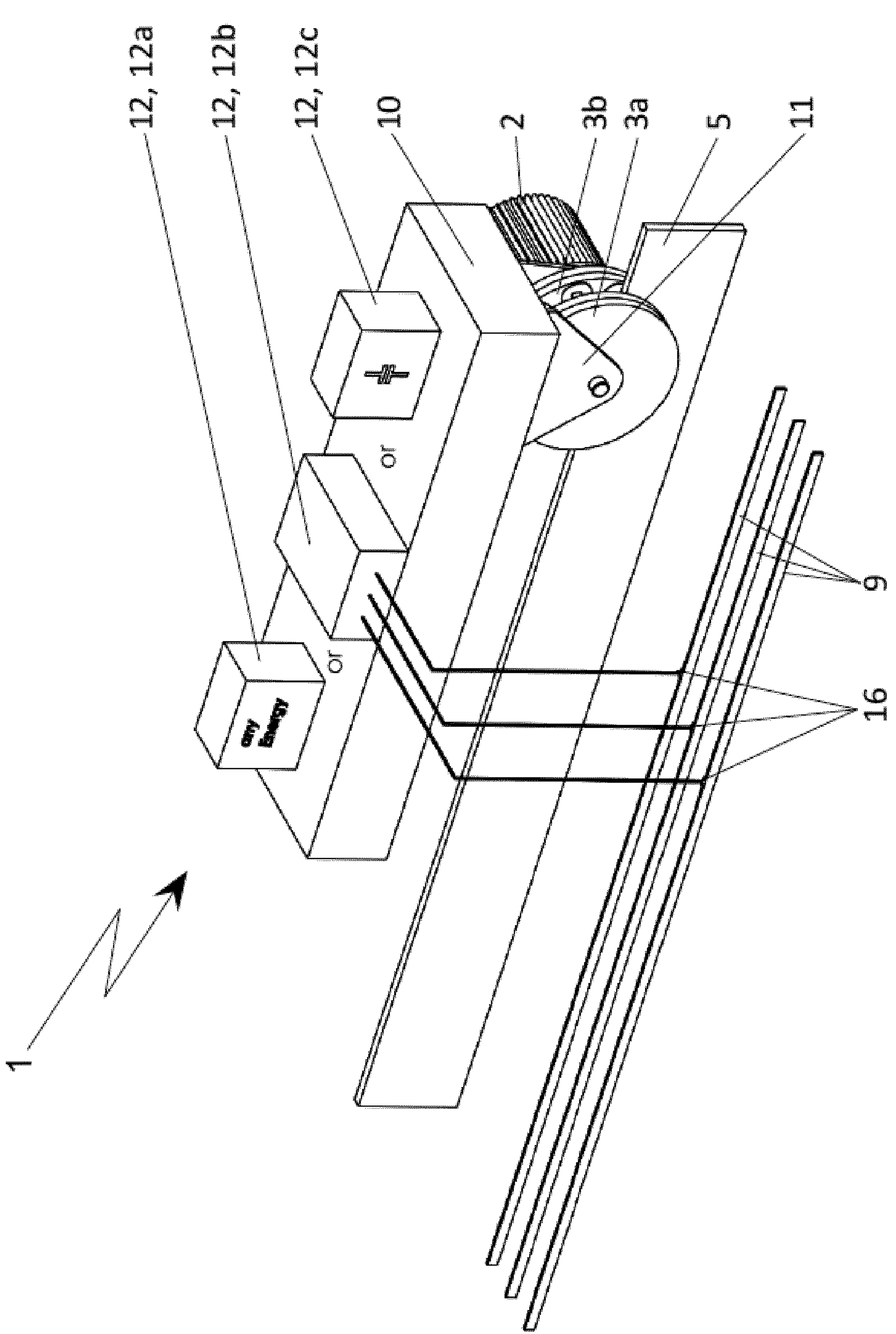
FIG. 3 shows a further illustrative example of the linear drive according to FIG. 1*a*, wherein this is arranged on a drive platform of a vehicle—not shown in more detail.

When putting the linear drive 1 according to the invention into operation, with the rotation drive 2 the secondary part 3 is displaced in a rotational movement with the direction of rotation 7*b*, with which the magnets 4 periodically turn into the region of the reaction track 5*a* and turn out again. Therefore, eddy currents 8 are produced in the reaction track 5*a*, the directions of flow of which come from the directions of the relevant magnetic field B 6; each induced eddy current 8 is aligned in such a way that the eddy current magnetic field thereby induced attempts to counteract the magnetic field B 6, wherein a repelling force results with the direction of force 7*a* and the secondary part 3 is driven translationally towards the primary part 5. The coordinate system 17 in FIG. 1*a* clarifies once again, in this case, the direction of flow aligned mutually perpendicular of the eddy currents I 8 to the magnetic field B 6 and the resulting direction of force F 7*a*, which provides for the translational drive. A necessary energy supply for the rotational drive 2 is not shown in more detail here; for this energy supply of the rotational drive 2, an electrical supply can be provided, a hydraulic or pneumatic or even a combination of two or three of the energy supply options mentioned. FIG. 3 shows a number of examples of possible energy supply options. This shows that the secondary part 3 of the linear drive 1 according to the invention is arranged with the rotation drive 2 on a supporting frame 11 of a drive platform 10 of a vehicle not shown here in more detail, wherein, through a number of current collectors 16 on the electrical tracks 9 an energy supply 12, 12*b* of the linear drive 1 can result on the drive platform 10. Further examples of energy supplies 12*a* or 12*c* are also indicated symbolically here, a further explanation of the same is unnecessary with respect to the knowledge of a person skilled in the art.

To be clear at this point it is noted that—without departing from the concept of the invention—it is optionally possible to implement the primary part 5 or the secondary part 3 fixed in place and the respective other part moving. Evidently in the travel operation it is also conceivable to introduce braking by changing the direction of rotation of the rotary drive 2 and—where electromagnets 4*b* are arranged on the secondary part 3—an at least partial recuperation of the braking energy is to be undertaken.

Figure 4A:
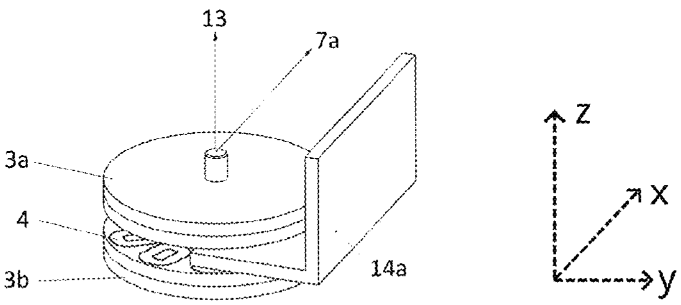
FIGS. 4*a*, 4*b* and 4*c* show even further illustrative examples of the linear drive according to FIG. 1*a*, wherein its magnetic supporting wheels are primarily arranged horizontally.
Figure 4B:
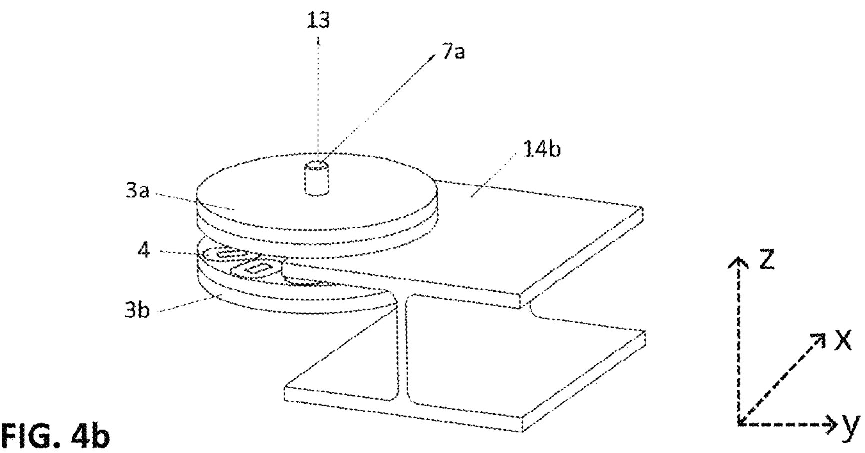

FIGS. 4*a* and 4*b* show two other illustrative examples of the linear drive 1 for track-guided means of land transportation or railway vehicles according to the invention, the difference of which to the linear drives 1 described above can be seen essentially in the horizontal arrangement of the secondary part 3 or the first and second magnetic wheel 3*a*, 3*b*. In FIG. 4*a*, for example, a leg of an L-profile beam 14*a* as reaction track and in FIG. 4*b* a leg of an H-profile beam 14*b*. Apart from the functioning for the translational drive discussed using FIG. 1*a* in direction of force F 7*a*, see also FIG. 1*a*, a further force results in operation, namely a lift force with a lift force direction 13 which—as shown here—means for the first and second wheel 3*a*, 3*b* a levitation from the L-profile beam 14*a* fixed in place compared with the H-profile beam 14*b* fixed in place. In a corresponding dimensioning and formation, therefore, levitation of the vehicle is therefore conceivable, with which not only the energy requirement of the running operation can be reduced, but also the wear, particularly in regions of high vehicle speeds. Purely for information, it must be noted that with the linear drive according to the invention, vehicle speeds can be achieved which are considerably above 200 kilometres per hour.

Figure 4C:
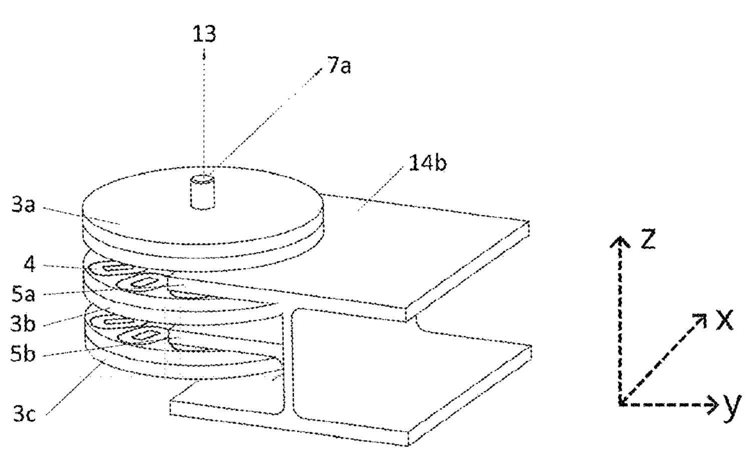

FIG. 4*c* shows a further advantageous illustrative example of the invention, in which, in comparison with the illustrative example FIG. 4*b*, shows a further second reaction track 5*b* arranged parallel to the first reaction track 5*a*, which is in active connection with a further magnetic wheel 3*c*.

REFERENCE NUMBER LIST

1 Linear drive
2 Rotation drive
3, 3*a*, 3*b*, 3*c* Secondary part; first, second, third magnetic wheel
4, 4*a*, 4*b* Magnets, permanent magnets, electromagnets, with N=north pole and S=south pole
4*c* Ferrite core for electromagnets
5, 5*a*, 5*b*, 5*c* Primary part, first or second reaction track, thrust plate
6 Magnetic field B, with N=north pole and S=south pole
7*a* Direction of force (F) of 3, translational
7*b* Direction of rotation of 3
8 Eddy currents I in 5
9 Electrical tracks for supply from 2
10 Drive platform (for a vehicle)
11 Supporting frame
12, 12*a*, 12*b*, 12*c* Energy supply
13 Direction of lift force (levitation)
14*a* L-profile beam for 5
14*b* H-profile beam for 5
15 Axle
16 Current collector on 9
17 Coordinate system

The invention claimed is:

1. A linear drive for track-guided land transportation or railway vehicles, comprising:

a primary part and a secondary part fixed in magnetically active connection to the primary part, wherein the primary part comprises at least one first reaction track and the secondary part comprises a number of magnets, wherein the secondary part comprises at least one first magnetic wheel and at least one second magnetic wheel arranged parallel thereto and the number of magnets are arranged on the at least one first magnetic wheel and the at least one second magnetic wheel, wherein the at least one first reaction track is arranged between the first magnetic wheel and the second magnetic wheel and is magnetically actively connected thereto, wherein the secondary part is mechanically connected to a rotation drive such that, upon activation of the linear drive, eddy currents are generated in the at least one first reaction track by rotation of the secondary part, resulting in a driving force, wherein the secondary part is driven in translation relative to the primary part, and wherein when the secondary part, the first magnetic wheel, and the second magnetic wheel are arranged parallel to a horizontal plane, the activation of the linear drive generates a lifting force in a vertical direction perpendicular to the horizontal plane to lift the first and second wheels relative to the primary part.

2. The linear drive according to claim 1, wherein the primary part includes at least one second reaction track parallel to the at least one first reaction track, and the secondary part includes a third magnetic wheel arranged parallel to both the at least one first magnetic wheel and the at least one second magnetic wheel, and wherein the at least one second reaction track is arranged between the second magnetic wheel and the third magnetic wheel and is magnetically actively connected to the third magnetic wheel.

3. The linear drive according to claim 2, wherein a number of magnets are arranged on at least one of the at least one second magnetic wheel and the third magnetic wheel.

4. The linear drive according to claim 1, wherein the primary part is arranged fixed in place and the secondary part is configured to move.

5. The linear drive according to claim 1, wherein the secondary part is arranged fixed in place and the primary part is configured to move.

6. The linear drive according to claim 1, wherein the magnets are formed as permanent magnets.

7. The linear drive according to claim 1, wherein the magnets are formed as separately-excited electromagnets.

8. The linear drive according to claim 7, wherein the magnets formed as separately-excited electromagnets comprise a ferrite core.

9. The linear drive according to claim 1, wherein the secondary part and the rotation drive are arranged on a drive platform.

10. The linear drive according to claim 1, wherein the magnetically active connection between the primary part and the secondary part is formed as an asynchronous coupling, wherein a number of eddy currents can be induced in the primary part.

11. The linear drive according to claim 1, wherein the rotation drive is formed as an electric machine, a hydraulic machine, or a pneumatic machine.

12. The linear drive according to claim 1, wherein the rotation drive is formed as a combined drive from the group of electrical, hydraulic or pneumatic machines.

13. The linear drive according to claim 1, wherein the at least one first reaction track includes a beam having a first leg extending parallel to the horizontal plane.

14. The linear drive according to claim 13, wherein the first leg extends between the first magnetic wheel and the second magnetic wheel.

* * * * *